(12) United States Patent
Lee

(10) Patent No.: US 8,493,195 B2
(45) Date of Patent: Jul. 23, 2013

(54) METHOD FOR DETECTING AN ENVIRONMENT OF A VEHICLE

(75) Inventor: Wei-Chia Lee, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 620 days.

(21) Appl. No.: 12/444,982

(22) PCT Filed: Oct. 1, 2007

(86) PCT No.: PCT/EP2007/060376
§ 371 (c)(1),
(2), (4) Date: Jan. 5, 2010

(87) PCT Pub. No.: WO2008/043676
PCT Pub. Date: Apr. 17, 2008

(65) Prior Publication Data
US 2010/0117813 A1 May 13, 2010

(30) Foreign Application Priority Data
Oct. 9, 2006 (DE) .................... 10 2006 047 634

(51) Int. Cl.
*B60Q 1/00* (2006.01)

(52) U.S. Cl.
USPC ......... 340/435; 340/436; 340/943; 340/937; 340/935; 340/939; 701/45; 701/301

(58) Field of Classification Search
USPC ........................... 340/435–437, 943
See application file for complete search history.

(56) References Cited

U.S. PATENT DOCUMENTS

| | | | | |
|---|---|---|---|---|
| 5,173,881 A * | 12/1992 | Sindle | .......... | 367/101 |
| 5,339,075 A * | 8/1994 | Abst et al. | .......... | 340/903 |
| 5,517,196 A * | 5/1996 | Pakett et al. | .......... | 342/70 |
| 5,734,336 A * | 3/1998 | Smithline | .......... | 340/903 |
| 5,754,123 A * | 5/1998 | Nashif et al. | .......... | 340/903 |
| 5,786,772 A * | 7/1998 | Schofield et al. | .......... | 340/903 |
| 5,949,331 A * | 9/1999 | Schofield et al. | .......... | 340/461 |
| 6,133,851 A * | 10/2000 | Johnson | .......... | 340/901 |
| 6,268,803 B1 * | 7/2001 | Gunderson et al. | .......... | 340/903 |
| 6,580,385 B1 * | 6/2003 | Winner et al. | .......... | 342/70 |
| 6,618,672 B2 * | 9/2003 | Sasaki et al. | .......... | 701/301 |
| 6,680,689 B1 * | 1/2004 | Zoratti | .......... | 342/70 |
| 6,744,353 B2 * | 6/2004 | Sjonell | .......... | 340/435 |
| 6,914,521 B2 * | 7/2005 | Rothkop | .......... | 340/425.5 |
| 7,012,560 B2 * | 3/2006 | Braeuchle et al. | .......... | 342/70 |
| 7,061,373 B2 * | 6/2006 | Takahashi | .......... | 340/435 |
| 7,289,019 B1 * | 10/2007 | Kertes | .......... | 340/435 |

(Continued)

FOREIGN PATENT DOCUMENTS

| | | |
|---|---|---|
| DE | 195 10 910 | 2/1995 |
| DE | 102 25 894 | 2/2004 |
| DE | 10 2005 015396 | 12/2005 |
| EP | 1 598 233 | 11/2005 |

OTHER PUBLICATIONS

International Search Report, PCT/EP2007/06037, dated Jan. 8, 2008.

*Primary Examiner* — Daniel Wu
*Assistant Examiner* — Son M Tang
(74) *Attorney, Agent, or Firm* — Kenyon & Kenyon LLP (57) ABSTRACT

A method is used for detecting the environment of a vehicle and utilizes a number of sensors, the sensors having different detection ranges, and a transition of an object between two detection ranges is bridged by prediction by using a handover algorithm.

21 Claims, 5 Drawing Sheets

U.S. PATENT DOCUMENTS

| | | | |
|---|---|---|---|
| 7,348,538 B2* | 3/2008 | Twiney et al. | 250/221 |
| 7,362,215 B2* | 4/2008 | Janssen | 340/426.25 |
| 7,378,947 B2* | 5/2008 | Daura Luna et al. | 340/435 |
| 7,394,355 B2* | 7/2008 | Sjonell | 340/435 |
| 7,561,181 B2* | 7/2009 | Schofield et al. | 348/148 |
| 7,640,108 B2* | 12/2009 | Shimizu et al. | 701/301 |
| 7,876,203 B2* | 1/2011 | Traylor et al. | 340/435 |
| 8,004,425 B2* | 8/2011 | Hoek et al. | 340/903 |
| 2002/0183929 A1* | 12/2002 | Tsuji et al. | 701/301 |
| 2005/0047158 A1* | 3/2005 | Koehler | 362/487 |

* cited by examiner

METHOD FOR DETECTING AN ENVIRONMENT OF A VEHICLE

FIELD OF THE INVENTION

The present invention relates to a method for detecting an environment of a vehicle, a system for executing the method, as well as to a computer program and a computer program product.

BACKGROUND INFORMATION

Lane-change assistants, as they are commonly referred to, which are used to warn a driver of an approaching vehicle, in particular one approaching from behind, are generally known. In this context it is especially important to alert the driver to vehicles located in the blind spot of the own vehicle. With planar rearview mirrors, this blind spot or blind spot region of the vehicle results to the left and right rear for the driver, to the side of the vehicle. If a vehicle is overtaken, the driver of the overtaken vehicle is unable to see the overtaking vehicle for a few seconds unless he looks over his shoulder. Although mandatory when turning and when changing lanes, this particular glance over the shoulder is often omitted, especially also on highways. It is precisely during highway travel at a high speed that a lane change may have far-reaching consequences.

Overtaking, turning, entering and starting to drive are situations in which the rearview mirror is used and in which the glance over the shoulder is obligatory. At present systems are available which monitor the blind spot region to the left and right of the own vehicle. If a vehicle is located in these regions, the system warns the driver by an optic and/or acoustic signal. If this vehicle is moving in the same driving direction as the own vehicle, then oncoming vehicles or stationary objects will not be indicated, however.

As a rule, a warning is given for the most proximate object. In addition, it may optionally be provided to specify the dimension of the monitoring or recording range as a function of the speed of the vehicle. A display and warning with regard to objects that move only little relative to the vehicle is implemented on the basis of the surround sensor, e.g., ultrasonic sensors, starting at a specific speed when driving forward.

At present, sensors having different recording ranges are obtainable. Long range radar (LRR) has a wide range but is blind at close range. Ultrasonic sensors (USS) have high sensitivity at close range but only a limited range. It must be taken into account, however, that functions such as the lane change assistant require the combination of both characteristics since some vehicles approach at very high speeds. To trigger a timely warning, it is therefore necessary to detect the approaching vehicle early enough.

One possibility consists of using what is known as short range radar (SRR), which has a reach of up to 40 m. However, these sensors are relatively expensive and as yet have not received approval for the transmit frequency in Europe.

Thus, there is a need for a method and a system that allow the use of different sensors having different detection ranges and which are able to be utilized within the framework of an adaptive speed control.

SUMMARY

The method according to example embodiments of the present invention is used for detecting an environment of a vehicle. A number of sensors having different detection ranges are used for this purpose. A transition of a detected object between two detection ranges in each case is bridged by prediction by using a handover algorithm. For reasons of safety, sensors may also be used redundantly, i.e., certain detection regions are monitored by more than one sensor.

In example embodiments of the present invention, the blind spot range is monitored or recorded using at least one of the sensors. The detection of the blind spot region is typically covered by a USS. For support, a sensor having a higher range may be used in addition, such as video, long-range radar (LRR) etc., which is directed toward the rear. Then, a transfer (handover) algorithm is used in order to bridge the transition between two detection regions by prediction. During the transition the driver may be notified of this state by a suitable interface (human-machine interface). This may be accomplished with the aid of an acoustic and/or optic signal, for example.

As a result, it is possible to detect vehicles early enough to trigger warnings in timely fashion. The driver is able to be informed about the dangerous situation in an unambiguous manner. It should not be overlooked that, prior to entering the blind spot range, the approaching vehicle constitutes a potential danger nevertheless. By predicting the entrance time, it is possible to output warnings earlier.

The described method when developed further may be used to aid a lane change assistant or it may be used in an adaptive speed control.

The system according to example embodiments of the present invention is used for executing a method for detecting an environment of a vehicle and it is especially suited for implementing the afore-described method. The system is to be connected to a number of sensors having different detection ranges, the system being designed to detect a transition of an object, such as another vehicle, for instance, between two detection ranges and to bridge this transition by prediction by utilizing a handover algorithm.

The system thus is provided to analyze data acquired by sensors and to inform or possibly warn the driver on the basis of this analysis.

The computer program according to example embodiments of the present invention includes program code in order to implement all of the steps of a method explained in the previous text when the computer program is executed on a computer or a corresponding computing unit, in particular a system of the type described earlier.

The computer program product according to example embodiments of the present invention includes this program code, which is stored on a computer-readable storage medium.

Additional features and aspects of the example embodiments of the present invention are described below with reference to the appended figures.

It is understood that the aforementioned features and the features still to be discussed in the following text may be used not only in the respectively indicated combination but also in other combinations or by themselves without departing from the scope hereof.

DETAILED DESCRIPTION

Example embodiments of the present invention are explained in more detail below with reference to the figures.

FIGS. 1 through 4 show the sequence of a typical traffic situation, in this case a passing maneuver. The figures show a first vehicle or ego vehicle 10, and a second vehicle or target vehicle 12. Target vehicle 12 is overtaking ego vehicle 10 whose blind spot region is being monitored. Ego vehicle 10 is equipped with a number of sensors for this purpose. For example, a long range 14 is monitored with the aid of radar or video, and a near range 16 is monitored with the aid of one or a plurality of ultrasonic sensors. Four signal lights 18, which emit an optical signal, are provided to warn the driver of ego vehicle 10. In addition, an acoustic signal may be output as well.

The method for blind spot monitoring is to warn the driver as soon as an object is located within the blind spot region of ego vehicle 10. However, if this were done all the time, then the driver would be flooded with warnings. Passing a guardrail, for example, would cause a permanent warning. For this reason it is important to limit the warnings to the relevant objects. It is likewise not intended to warn of oncoming traffic, stationary objects and vehicles overtaken by the ego vehicle (overtaken vehicles). However, a warning is to be output in the event of moving vehicles in the blind spot region, which enter the blind spot from behind or from the sides or which remain in the blind spot for more than a predefined number of seconds after having been overtaken. The vehicle has two sensors 20 and 22 on each side of the vehicle for this purpose.

Rear sensors 22 are situated at the tail end of ego vehicle 10 with a direction of view of approximately 45° to the rear. Front sensors 20 are aligned to the side. Rear sensors 22 detect objects within the blind spot. Front sensors 20 plausibilize objects such as guardrails and the oncoming traffic over the time and driving distance, and suppress a warning in this case.

In order to be able to detect vehicles approaching from behind in a timely manner, an additional sensor 24, e.g., an LRR, is used as well. It has a range of more than 150 m. If target vehicle 12 approaches from behind, it is recorded or detected by additional sensor 24 of equipped ego vehicle 10. First, the detected object is recognized and confirmed as target vehicle (plausibilization). Then, the relative velocity with respect to ego vehicle 10 is determined. From this, it is possible to calculate the time until a possible collision (time to collision: TTC). If the distance between both vehicles 10 and 12 is insufficient for a lane change, then a warning is triggered in ego vehicle 10; in this case all four signal lights 18 are activated.

The illustration shows that detection range 14 of additional sensor 24 does not overlap with detection ranges 16 of rear sensors 22. There exists a transition or transition region 26, which is indicated by a double arrow in FIG. 2. If target vehicle 12 is in this transition 26, then an intermittent warning is output by signal lights 18 since target vehicle 12 is detected by none of sensors 20, 22 and 24. With the aid of the most recently measured relative velocity from additional sensor 24 and additional data such as the acceleration of ego vehicle 10, the traffic situation etc., the time until entering range 16 of rear sensors 22 is predicted. If target vehicle 12 does not enter detection range 16 of rear sensors 22 once the predicted time interval including certain tolerances has elapsed (timeout), then the warning is terminated.

Figure 1:
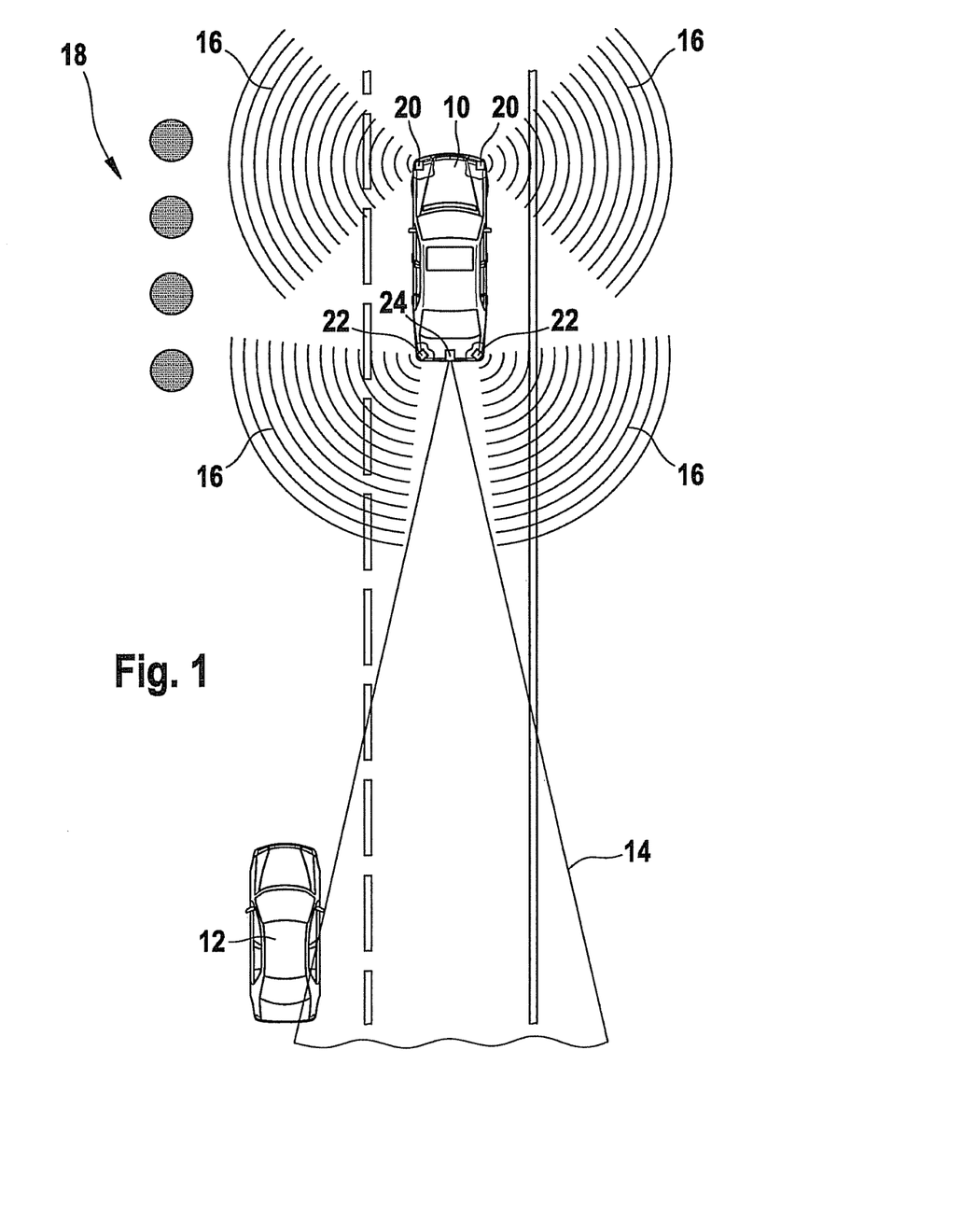
FIG. 1 shows a traffic situation to clarify the specific development of the method according to example embodiments of the present invention.
Figure 2:
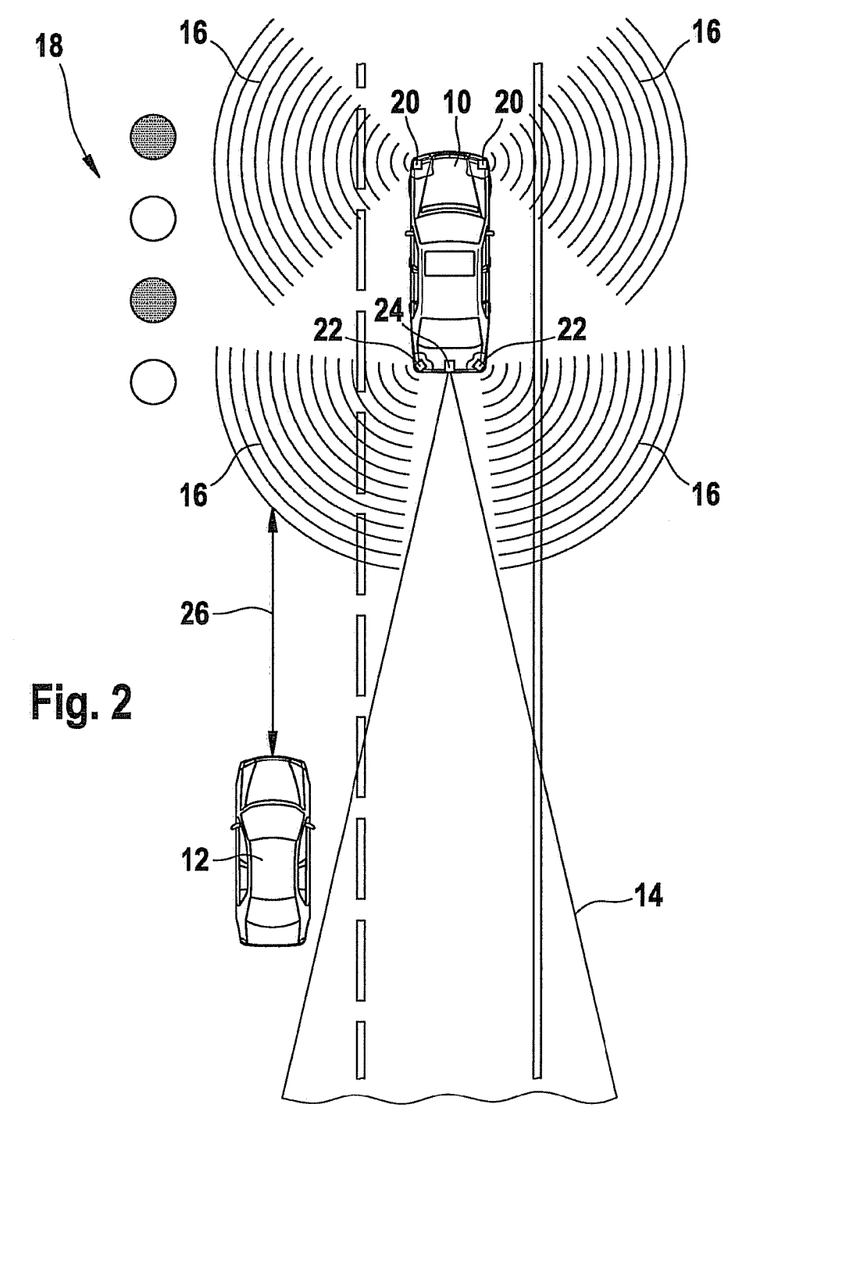
FIG. 2 shows a traffic situation following the situation illustrated in FIG. 1.
Figure 3:
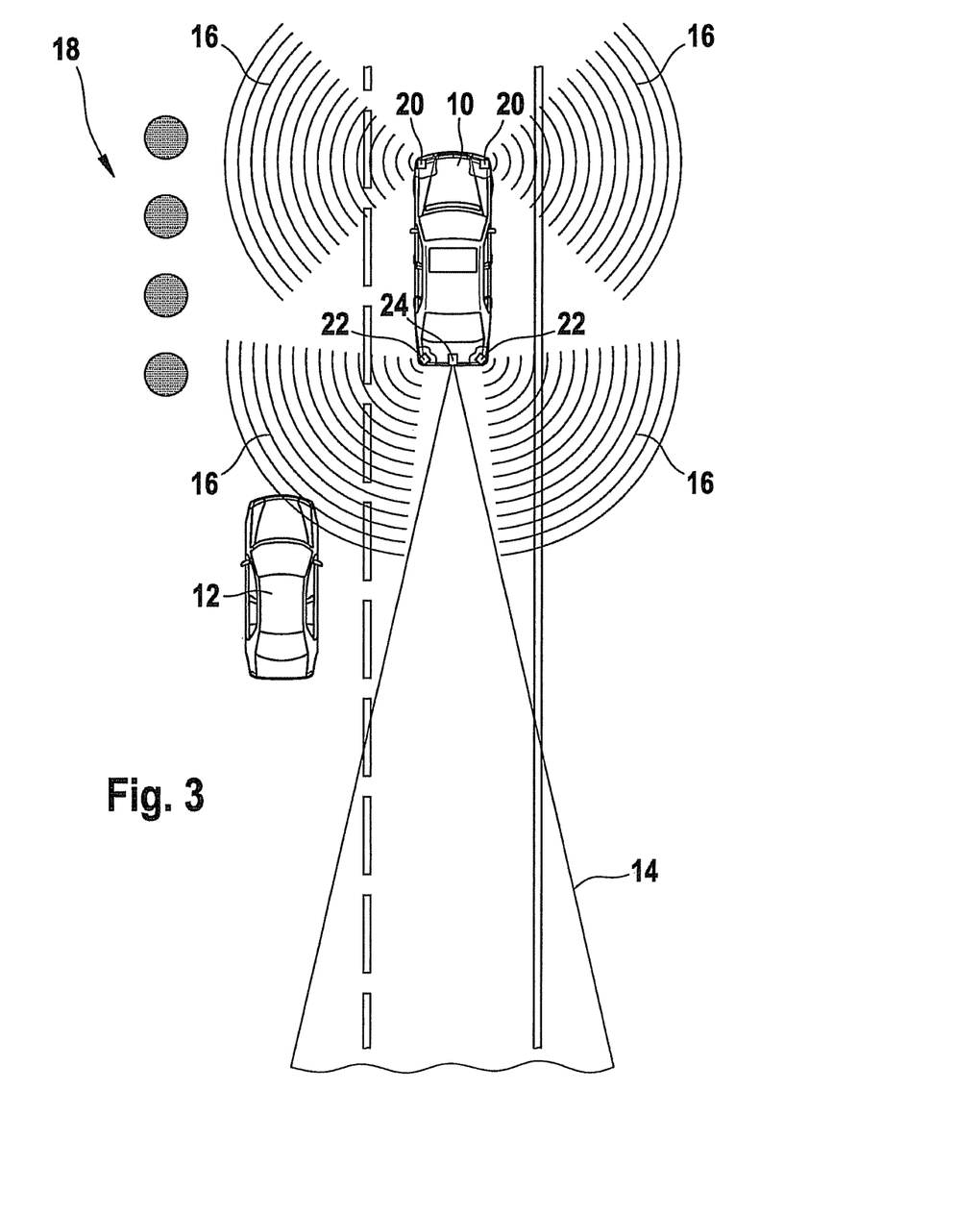
FIG. 3 shows a subsequent traffic situation.

If rear sensors 22 detect an object within the predicted time interval, then a specific warning may once again be output using signal lights 18, as illustrated in FIG. 3. In this case the plausibilization of target vehicle 12 is shortened, i.e., reduced from three detection cycles to one, by the prediction, since after all, an object—in this case, target vehicle 12—has been "expected". In this manner, the driver is able to obtain an earlier warning and adapt his driving behavior to the situation in timely fashion.

Figure 4:
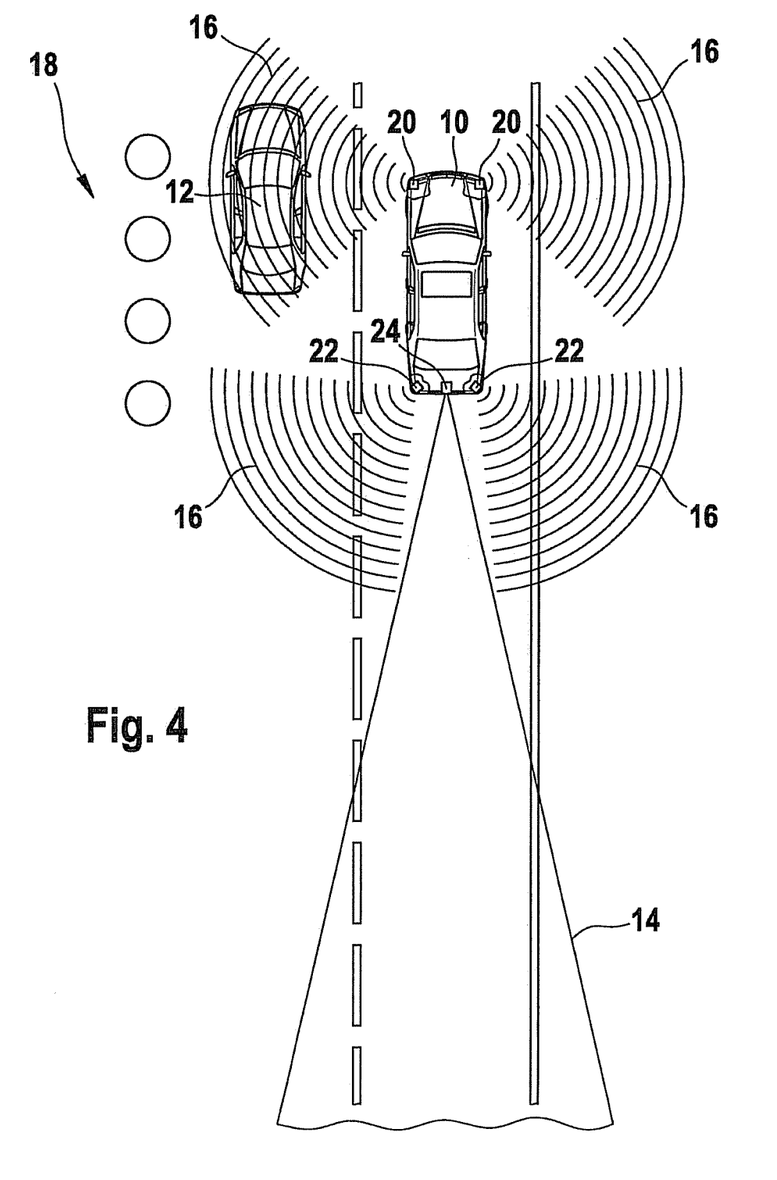
FIG. 4 shows a final traffic situation.

The warning is output until target vehicle 12 is clearly seen by the driver in ego vehicle 10, as shown in FIG. 4. The passing maneuver is nearly finished, the target vehicle is within detection range 16 of left front sensor 20, so that the danger situation has come to an end. The driver of ego vehicle 10 is thus informed that a lane change operation could be made without risk.

The method explained in FIGS. 1 through 4 warns the driver only in dangerous situations. The driver is not overwhelmed by an excess of information.

Figure 5:
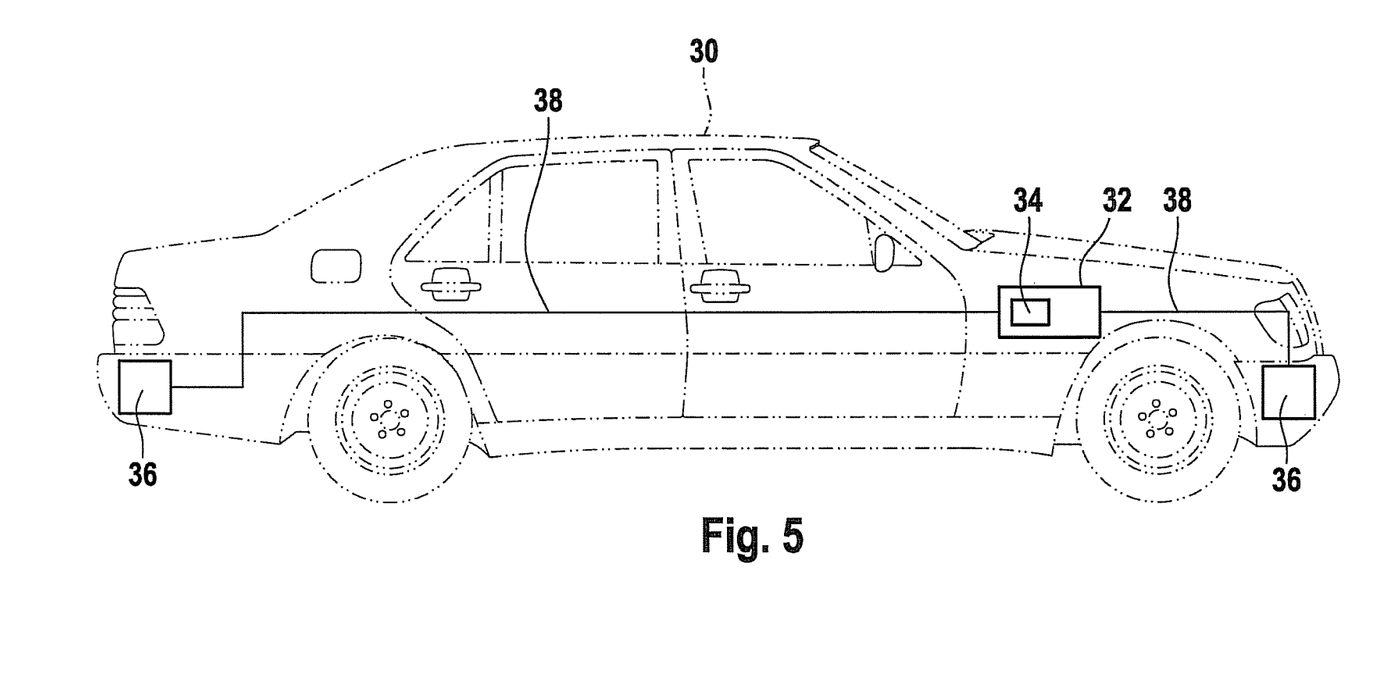
FIG. 5 shows the system according to example embodiments of the present invention.

FIG. 5 shows a vehicle 30 having the device according to an example embodiment of the present invention, which over all has been denoted by reference numeral 32. Provided in this device 32 is a computing unit 34, which analyzes data with regard to traffic participants and traffic situations acquired by sensors 36, which are connected to system 32 via signal links 38.

This analysis makes it possible to provide the driver with comprehensive information about dangerous traffic situations. Transitions between different detection ranges of sensors 36 are bridged by prediction by utilizing a handover algorithm.

What is claimed is:

1. A method for detecting an environment of a vehicle having a plurality of sensors, the sensors having different detection ranges, comprising:
    activating a plurality of signal lights to alert a driver of a presence of an object in a transition between two detection ranges;
    bridging the transition of the object between two detection ranges by prediction by utilizing a handover algorithm; and
    terminating the activation of the signal lights if the object does not enter a range of one of the sensors by a predicted time value.

2. The method according to claim 1, wherein a blind spot region of the vehicle is detected using at least one of the sensors.

3. The method according to claim 2, wherein the blind spot region of the vehicle is detected by an ultrasonic sensor.

4. The method according to claim 1, wherein a sensor having a long range is used to detect a region in a rear of the vehicle.

5. The method according to claim 1, wherein a warning is output if a dangerous situation exists.

6. The method according to claim 1, wherein the driver is alerted of the transition between two detection ranges by an interface.

7. The method according to claim 1, wherein the method is used to aid a lane change assistant.

8. A system for detecting an environment of a vehicle, comprising:
    a plurality of sensors having different detection ranges;
    a plurality of signal lights;
    wherein the system is adapted to detect a transition of an object between two detection ranges and to activate the signal lights to alert a driver of a presence of the object in the transition, bridging of the transition occurring through prediction by using a handover algorithm, and wherein activation of the signal lights is terminated if the object does not enter a range of one of the sensors by a predicted time value.

9. The system according to claim 8, wherein the blind spot region of the vehicle is detected using at least one of the sensors.

10. The system according to claim 9, wherein the blind spot region of the vehicle is detected by an ultrasonic sensor.

11. The system according to claim 8, wherein a sensor having a long range is used to detect a region in a rear of the vehicle.

12. The system according to claim 8, wherein a warning is output if a dangerous situation exists.

13. The system according to claim 8, wherein the driver is alerted of the transition between the two detection ranges through an interface.

14. The system according to claim 8, wherein the system is used to aid a lane change assistant.

15. A non-transitory computer-readable storage medium having a computer program, which is executable on a computing unit, the computer-readable storage medium comprising:
  a program code arrangement having program code for detecting an environment of a vehicle by performing the following:
    activate a plurality of signal lights to alert a driver of a presence of an object in a transition between two detection ranges;
    bridge the transition of the object between two detection ranges by prediction by utilizing a handover algorithm; and
    terminate the activation of the signal lights if the object does not enter a range of one of the sensors by a predicted time value.

16. The non-transitory computer-readable storage medium according to claim 15, wherein the blind spot region of the vehicle is detected using at least one of the sensors.

17. The non-transitory computer-readable storage medium according to claim 16, wherein the blind spot region of the vehicle is detected by an ultrasonic sensor.

18. The non-transitory computer-readable storage medium according to claim 15, wherein a sensor having a long range is used to detect a region in a rear of the vehicle.

19. The non-transitory computer-readable storage medium according to claim 15, wherein a warning is output if a dangerous situation exists.

20. The non-transitory computer-readable storage medium according to claim 15, wherein the driver is alerted of the transition between the two detection ranges through an interface.

21. The non-transitory computer-readable storage medium according to claim 15, wherein the system is used to aid a lane change assistant.

* * * * *

UNITED STATES PATENT AND TRADEMARK OFFICE
CERTIFICATE OF CORRECTION

PATENT NO. : 8,493,195 B2  Page 1 of 1
APPLICATION NO. : 12/444982
DATED : July 23, 2013
INVENTOR(S) : Wei-Chia Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this
Eighth Day of September, 2015

Michelle K. Lee
*Director of the United States Patent and Trademark Office*